US006789047B1

(12) United States Patent
Woodson (10) Patent No.: US 6,789,047 B1
(45) Date of Patent: Sep. 7, 2004

(54) METHOD AND SYSTEM FOR EVALUATING THE PERFORMANCE OF AN INSTRUCTOR OF AN ELECTRONIC COURSE

(75) Inventor: Stephanie Woodson, Chicago, IL (US)

(73) Assignee: UNext.com LLC, Deerfield, IL (US)

( * ) Notice: Subject to any disclaimer, the term of this patent is extended or adjusted under 35 U.S.C. 154(b) by 0 days.

(21) Appl. No.: 09/836,836

(22) Filed: Apr. 17, 2001

(51) Int. Cl.[7] .......................... G06F 17/30; G09B 3/00; G09B 23/00
(52) U.S. Cl. ....................... 702/182; 434/118; 434/276; 434/322; 434/350; 705/11
(58) Field of Search ............................. 702/81, 82, 84, 702/127, 182; 434/118, 276, 322, 336, 350, 362; 703/17; 379/265.06; 705/11, 14

(56) References Cited

U.S. PATENT DOCUMENTS

| | | | |
|---|---|---|---|
| 4,238,893 A | 12/1980 | Komatsubara et al. ...... | 434/351 |
| 4,772,206 A | 9/1988 | Kerr et al. ................... | 434/118 |
| 4,786,255 A | 11/1988 | Hiramatsu et al. .......... | 434/157 |
| 4,820,167 A | 4/1989 | Nobles et al. ............... | 434/336 |
| 4,846,693 A | 7/1989 | Baer ........................... | 434/308 |
| 4,877,404 A | 10/1989 | Warren et al. ............... | 343/118 |
| 5,002,491 A | 3/1991 | Abrahamson et al. ....... | 434/322 |
| 5,006,987 A | 4/1991 | Harless ........................ | 434/323 |
| 5,267,865 A | 12/1993 | Lee et al. .................... | 434/350 |
| 5,273,433 A | 12/1993 | Kaminski et al. ........... | 434/169 |
| 5,310,349 A | 5/1994 | Daniels et al. .............. | 434/350 |
| 5,393,071 A | 2/1995 | Best ............................ | 463/35 |
| 5,395,243 A | 3/1995 | Lubin et al. ................ | 434/118 |
| 5,441,415 A | 8/1995 | Lee et al. .................... | 434/350 |
| 5,597,312 A | 1/1997 | Bloom et al. ................ | 434/362 |
| 5,724,262 A * | 3/1998 | Ghahramani ................ | 702/186 |
| 5,727,950 A | 3/1998 | Cook et al. .................. | 434/350 |
| 5,788,508 A | 8/1998 | Lee et al. .................... | 434/350 |
| 5,810,599 A | 9/1998 | Bishop ........................ | 434/157 |
| 5,810,605 A | 9/1998 | Siefert ........................ | 434/362 |

(List continued on next page.)

FOREIGN PATENT DOCUMENTS

WO    WO 98/22864    5/1998

OTHER PUBLICATIONS

"Teachers Assistant": A web–based Application using Java Server pages and Java Database Connectivity—Susamma Barua–2000—IEEE (pp: 828–833).

"Web–based Virtual Classroom "—Vladimir Trajkovic, Danco Davcev, Goran Kimovski and Zaneta Petanceska—2000—IEEE (pp: 137–146).

(List continued on next page.)

Primary Examiner—John Barlow
Assistant Examiner—John Le
(74) Attorney, Agent, or Firm—Brinks Hofer Gilson & Lione (57) ABSTRACT

A system and method of evaluating the performance of an instructor of an electronic course is well suited for establishing a performance-based component of pay for the instructor to provide the instructor with a financial incentive for meeting a performance goal. A communications monitor monitors quantitative performance data on the instructor and students participating in an electronic course. A first database 32 stores the monitored quantitative performance data. A data processor determines at least one quantitative evaluative factor of a course attendance factor and an instructor response time based on the quantitative performance data. The communications monitor facilitates the gathering of qualitative performance data in a second database. The qualitative performance data may be reviewed to form a qualitative evaluation report of the instructor.

27 Claims, 3 Drawing Sheets

U.S. PATENT DOCUMENTS

| | | | | |
|---|---|---|---|---|
| 5,813,863 | A | | 9/1998 | Sloane et al. ............... 434/236 |
| 5,823,781 | A | | 10/1998 | Hitchcock et al. .......... 434/118 |
| 5,823,788 | A | | 10/1998 | Lemelson et al. .......... 434/350 |
| 5,864,869 | A | | 1/1999 | Doak et al. ............. 701/104.1 |
| 5,882,202 | A | | 3/1999 | Sameth et al. ............. 434/157 |
| 5,885,083 | A | | 3/1999 | Ferrell ........................ 434/136 |
| 5,909,589 | A | | 6/1999 | Parker et al. ................. 712/32 |
| 5,947,747 | A | | 9/1999 | Walker et al. .............. 434/354 |
| 5,957,699 | A | | 9/1999 | Peterson et al. ............ 434/350 |
| 5,974,446 | A | | 10/1999 | Sonnenreich et al. ....... 709/204 |
| 5,978,648 | A | | 11/1999 | George et al. ............. 434/362 |
| 5,987,443 | A | | 11/1999 | Nichols et al. .............. 706/11 |
| 6,002,915 | A | * | 12/1999 | Shimizu ..................... 434/350 |
| 6,014,134 | A | | 1/2000 | Bell et al. ................... 345/705 |
| 6,021,119 | A | | 2/2000 | Derks et al. ................ 370/261 |
| 6,024,577 | A | | 2/2000 | Wadahama et al. ......... 434/322 |
| 6,029,043 | A | | 2/2000 | Ho et al. .................... 434/350 |
| 6,033,226 | A | | 3/2000 | Bullen ........................ 434/219 |
| 6,039,575 | A | | 3/2000 | L'Allier et al. ............. 434/323 |
| 6,064,856 | A | | 5/2000 | Lee et al. ................... 434/350 |
| 6,064,865 | A | | 5/2000 | Kuo et al. .................. 455/135 |
| 6,106,399 | A | | 8/2000 | Baker et al. .................. 463/42 |
| 6,126,448 | A | | 10/2000 | Ho et al. .................... 434/219 |
| 6,141,528 | A | | 10/2000 | Remschel ................... 434/350 |
| 6,149,441 | A | | 11/2000 | Pelligrino et al. .......... 434/350 |
| 6,157,808 | A | * | 12/2000 | Hollingsworth ............ 434/350 |
| 6,162,060 | A | | 12/2000 | Richard et al. ............. 434/118 |
| 6,164,974 | A | * | 12/2000 | Carlile et al. ............... 434/322 |
| 6,196,846 | B1 | | 3/2001 | Berger et al. ............... 434/118 |
| 6,210,272 | B1 | | 4/2001 | Brown .......................... 463/1 |
| 6,261,103 | B1 | | 7/2001 | Stephens et al. ............ 434/276 |
| 6,275,812 | B1 | | 8/2001 | Haq et al. ..................... 705/11 |
| 6,282,404 | B1 | * | 8/2001 | Linton ........................ 434/350 |
| 6,283,760 | B1 | | 9/2001 | Wakamoto .................. 434/156 |
| 6,296,487 | B1 | | 10/2001 | Lotecka ...................... 434/118 |
| 6,301,462 | B1 | * | 10/2001 | Freeman ..................... 434/350 |
| 6,301,571 | B1 | | 10/2001 | Tatsuoka ..................... 706/45 |
| 6,302,698 | B1 | * | 10/2001 | Ziv-El ........................ 434/323 |
| 6,324,282 | B1 | * | 11/2001 | McIllwaine et al. ... 379/265.06 |
| 6,325,632 | B1 | | 12/2001 | Chao et al. ................. 434/322 |
| 6,341,960 | B1 | | 1/2002 | Frasson et al. ............. 434/322 |
| 6,347,333 | B2 | | 2/2002 | Eisendrath et al. ......... 709/217 |
| 6,353,447 | B1 | | 3/2002 | Truluck et al. ............. 345/733 |
| 6,358,053 | B1 | | 3/2002 | Rosenfield et al. ......... 434/156 |
| 6,364,667 | B1 | * | 4/2002 | Heinberg et al. ........... 434/322 |
| 6,370,355 | B1 | * | 4/2002 | Ceretta et al. .............. 434/350 |
| 6,370,494 | B1 | * | 4/2002 | Mizuno et al. ............... 703/17 |
| 6,386,883 | B2 | | 5/2002 | Siefert ........................ 434/322 |
| 6,405,226 | B1 | | 6/2002 | Alpert et al. ............... 715/530 |
| 6,411,796 | B1 | | 6/2002 | Remschel ................... 434/350 |
| 6,470,171 | B1 | | 10/2002 | Helmick et al. ............ 434/362 |
| 6,523,007 | B2 | | 2/2003 | Layng et al. ............... 704/270 |
| 2002/0076677 | A1 | | 6/2002 | Wasowicz et al. .......... 434/178 |
| 2002/0098468 | A1 | | 7/2002 | Barrett et al. ............... 434/322 |
| 2002/0160347 | A1 | | 10/2002 | Wallace et al. ............. 434/322 |
| 2002/0187463 | A1 | | 12/2002 | Aspe et al. ................. 434/362 |
| 2003/0087223 | A1 | | 5/2003 | Walker et al. .............. 434/353 |

OTHER PUBLICATIONS

"The Virtual Learning Environment System"—Anup Kumar, Raj Pakala R.K. Ragade and J.P. Wong—1998—IEEE (pp: 711–716).

Yahoo! Internet Life Magazine Names Dakota State University the #12 Most Wired College in the Country, [online] [retrieved on Nov. 23, 1998] retrieved from the Internet: <URL: http:/www.dsu.edu/yahoo.htm.

DSU Open Internet Courses, [online] [retrieved on Nov. 23, 1998] retrieved from the Internet: <URL: http:/www.courses.dsu.edu/disted/courses.htm.

Menu Pages for "The Commons", [online] [retrieved on Nov. 5, 1998] retrieved from the Internet: <URL: http://www.wcc–eun.com/wln/commons/index.html.

Home Pages For University Without Walls At the University of Massachusetts Amherst, [online] [retrieved on Nov. 5, 1998] retrieved from the Internet: <URL: http://www.klaatu.oit.umass.edu/uww/uww_home.html.

Slide Show of Information Relating To Online Education Programs, [online] [retrieved on Nov. 5, 1998] retrieved from the Internet: <URL: http://www.howardcc.edu/hcc/facpres/sld003.htm (Slides 3–13 of 14).

ADEC and Virtual Universities "Toward Common Vision and Action", [online] [retrieved on Nov. 5, 1998] retrieved from the Internet: <URL: htt;://www.adec.edu/vuniv/adec/place1.html.

SINEwave The COB Virtual Campus (Distance Learning at the College of Business at UCB), [online] [retrieved on Nov. 5, 1998] retrieved from the Internet: <URL: http://www.colorado.edu/infs/jcb/sinewave/service/virtualcampus/.

Welcome to the California Virtual University, [online] [retrieved on Nov. 5, 1998] retrieved from the Internet: <URL: http://www.california.edu/about.html.

Article Discussing Design of Online University: Johnstone/Jones: Western Governors University, [online] [retrieved on Nov. 5, 1998] retrieved from the Internet: <URL: http://www.ttu.edu/lists/acw–1/9707/0078.html.

Web Pages Relating To Western Governors University Website at [online] [retrieved on Nov. 5, 1998] retrieved from the Internet: <URL: http://www.wgu.edu/wgu/academics/dist_learning/html.

Website for the University of Phoenix Online Campus, [online] [retrieved on Nov. 5, 1998] retrieved from the Internet: <URL: http://www.uophx.edu/online/on1_camp.htm.

Printout of Website for: The Electronic University Network, [online] [retrieved on Nov. 5, 1998] retrieved from the Internet: <URL: http://www.wcc–eun.com/eun.html.

Website Entitled Brevard Community College Online . . . Telecommute on the Information Super Highway with BCC, [online] [retrieved on Nov. 5, 1998] retrieved from the Internet: <URL: http://brevard.cc.fl.us/online/campus/.

Web Page Entitled "Welcome to . . . Apollo Group, Inc.", [online] [retreived on Nov. 5, 1998] retrieved from the Internet: <URL: http://www.apollogrp.com/.

Micron University Home Page Entitled "Micron U", [online] [retreived on Nov. 4, 1998] retrieved from the Internet: <URL: http://programs.micronpc.com/micro . . . OL1RTR4UWVPBGP3&where=home&why=gen.

Meyrowitz, "Intermedia: The Architecture and Construction of an Onject–Oriented Hypermedia System and Applications Framework", OOPSLA '86 Proceedings published Sep. 1986.

Bonar et al., "An Object–Oriented Architecture For Intelligent Tutoring Systems", OOPSLA '86 Proceedings published Sep. 1986.

Weyer et al., "A Prototype Electronic Encyclopedia", ACM Transactions on Office Information Systems, vol. 3, No. 1, Jan. 1985, pp. 63–88.

Article in Byte Magazine entitled "The Difference in Higher Education" dated Feb. 1987.

Morris et al. "Andrew: A Distributed Personal Computing Environment", Communications of the ACM, Mar. 1986, vol. 29, No. 3.

Wiseman, "Teaching (Virtually) Teaching", [online] [retrieved on Nov. 23, 1998] retrieved from the Internet: <URL: http://gsula.gsu.edu/faculty/lawppw/vtt/virtual.html.

Patent Abstracts of Japan, English Abstract for Japanese Application Publication No. 08235089 "Education Support System" Published Sep. 13, 1996.

Patent Abstract of Japan, English Abstract For Japanese Application Publication No. 10040199 "Education Support System" Published Feb. 13, 1998.

U.S. patent application Ser. No. 09/884,168 (Attorney Docket No. 10257–13) filed Jun. 18, 2001, entitled "Method and System for Analyzing Student Performance in an Electronic Course" and the inventor as Alan Drimmer.

Richard E. Osgood, *The Conceptual Indexing of Conversational Hypertext*, Jun. 1994 (a doctoral dissertation that was or may be accessible to the public via the Northwestern University Library, Evanston, Illinois).

Co-pending U.S. patent application Ser. No. 09/746,592 (Attorney Docket No. 10257–7) filed Dec. 21, 2000, entitled "Administrator and Instructor Course Management Application for an Online Education Course", Strub et al.

Entire website—[online]. Retrieved from the Internet. <URL: http://www.exceller.com>.

Entire website—[online]. Retrieved from the Internet. <URL: http://www.studyspanish.com>.

Entire website—[online]. Retrieved from the Internet. <URL: http://www.surf2school.com/English/banner.asp>.

* cited by examiner

METHOD AND SYSTEM FOR EVALUATING THE PERFORMANCE OF AN INSTRUCTOR OF AN ELECTRONIC COURSE

FIELD OF INVENTION

This invention relates to method and system of evaluating the performance of an instructor of an electronic course.

BACKGROUND

An on-line, educational institution offers courses that are presented over a communications network, such as the Internet. By its nature, an on-line, educational institution may reach many students that are widely, geographically dispersed. One or more instructors may teach a section of a course for a group of students. The success of the on-line educational institution depends upon the effectiveness of the instructor in promoting student participation in the course and interaction among the students and the instructor in a manner that creates an educational learning environment. Thus, a need exists for evaluating the performance of an instructor and providing the instructor with an appropriate financial incentive to meet performance objectives of the on-line university.

In a traditional university, a professor may be evaluated based on the results of student surveys completed at the end of a course. The professor may also be evaluated based on the quantity of publications that the professor generates, the amount of grants for research that the professor successfully obtains for the university, and the significance of any research that the professor undertakes for the university's benefit. Although an on-line educational institution could use some of the foregoing factors to evaluate the performance of an instructor, the goal of some on-line educational institutions may be to provide a superior learning environment to even that of a traditional classroom. Thus, a need exists for adequately assessing the teaching performance of an instructor of an electronic course.

SUMMARY

In accordance with the invention, a system and method of evaluating the performance of an instructor of an electronic course is well suited for establishing a performance-based component of pay for the instructor to provide the instructor with a financial incentive for meeting a teaching performance goal. A communications monitor monitors quantitative performance data on the instructor and students participating in an electronic course. A first database stores the monitored quantitative performance data. A data processor determines at least one quantitative evaluative factor of a course-attendance factor (e.g., course completion rate) and an instructor response time based on the quantitative performance data.

In accordance with one aspect of the invention, an on-line educational institution may establish a performance goal for the instructor based upon the at least one quantitative evaluation factor, a qualitative evaluation report, or both. For example, quantitative evaluative factors may be reviewed to determine if one or more quantitative evaluative factors comply with qualifying thresholds as the performance goal, which may qualify the instructor for receipt of a performance-based component of pay, among other possible considerations. In one configuration, the communications monitor may facilitate the gathering of qualitative performance data in a second database. The qualitative performance data may be reviewed to form a qualitative evaluation report of the instructor.

DETAILED DESCRIPTION

Figure 1:
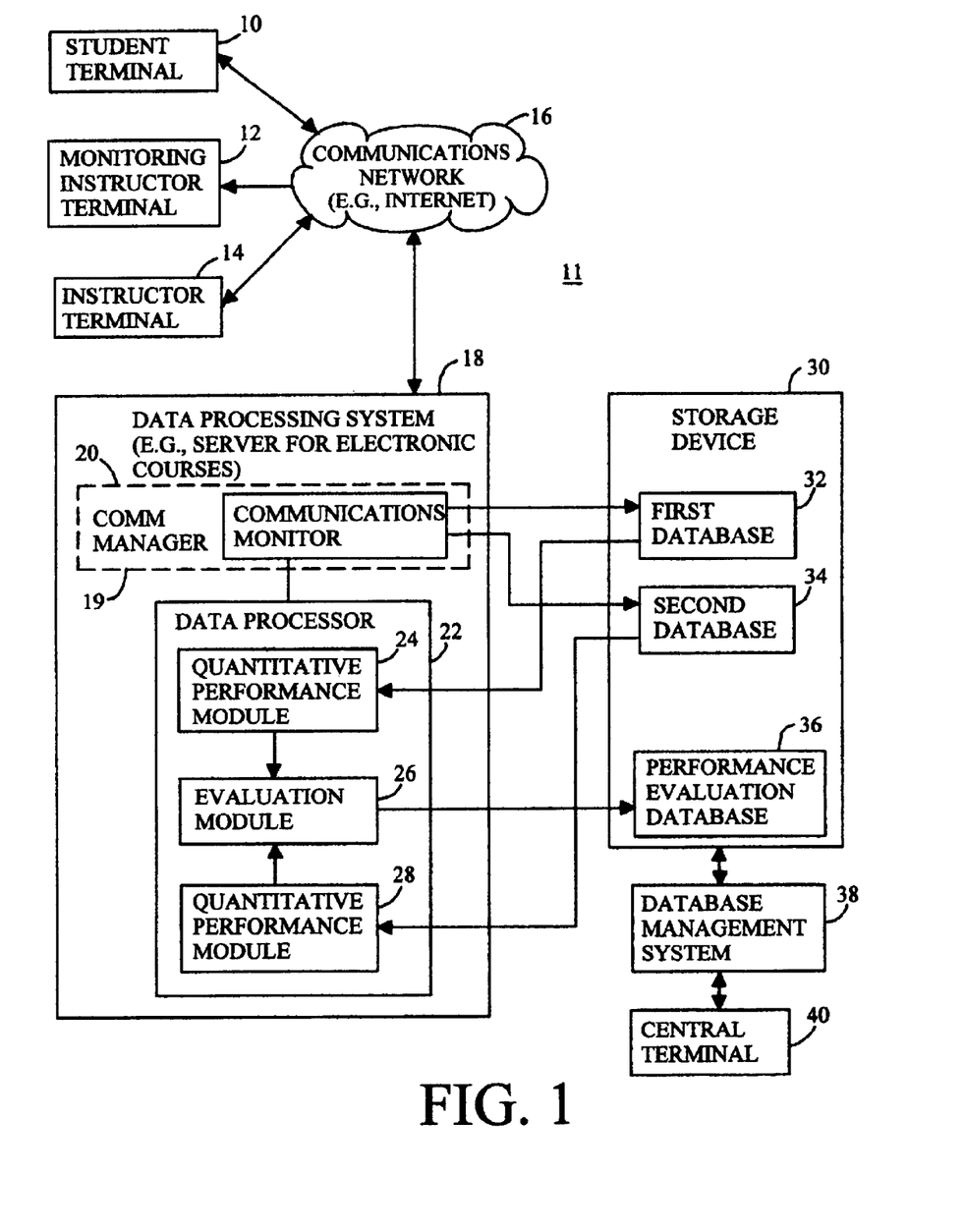
FIG. 1 is a block diagram of a system for evaluating the performance of an instructor of an electronic course in accordance with the invention.

In accordance with the invention, FIG. 1 shows a block diagram of an evaluation system 11 for evaluating the performance of an instructor of an electronic course. The system 11 may include a data processing system 18, a storage device 30, and a database management system 38 of an on-line educational institution. The data processing system 18 is coupled to the storage device 30. In turn, the storage device 30 is coupled to a database management system 38. A central terminal 40 may be coupled to the database management system 38 to query, search, and retrieve records in any of various databases stored in the storage device 30.

The data processing system 18 supports communications with various terminals (10, 12, and 14) over a communications network 16, such as the Internet, an intranet, or any other suitable communications network. The data processing system 18 may represent a server and the terminals may represent clients. As shown in FIG. 1, the terminals may include at least one student terminal 10, a monitoring instructor terminal 12, and an instructor terminal 14 for a section of an electronic course. A section refers to a work group of an instructor and one or more students associated with an electronic course. The student terminal 10, the monitoring instructor terminal 12, and the instructor terminal 14 are arranged to communicate with the data processing system 18 over the communications network 16.

The data processing system 18 may represent a computer or server that is programmed to present or deliver an electronic course to one or more student terminals 10 assigned to a section of the electronic course. The data processing system 18 may provide textual, audio, or audio-visual, or multimedia presentations of course material over the communications network 16 to one or more student terminals 10. The student terminal 10 may access course assignments and instructional materials that are available via the data processing system 18.

The data processing system 18 may include a communications manager 19 for managing communications between a monitoring instructor terminal 12 and an instructor terminal 14, between or among a group of student terminals 10, and between an instructor terminal 14 and at least one student terminal 10. The communications manager 19 includes a communications monitor 20. The communications monitor 20 facilitates the ability of the monitoring instructor terminal 12 to monitor, sample, or eavesdrop on communications between the instructor terminal 14 and one or more student terminals 10.

The communications monitor 20 may separate data from monitored communications into quantitative performance data and qualitative performance data. Quantitative performance data refers to statistical data or other objective data that indicates the effectiveness of the teaching of the instructor. The qualitative performance data refers to raw presentation data (e.g., textual, multimedia, audio or visual data concerning the course), samples of communications, or excerpts of communications between an instructor (via an instructor terminal 14) and one or more students (via a student terminal 10) in a particular electronic course.

The communications monitor 20 may provide the monitoring instructor terminal 12 with access to bulletin board messages or postings that student terminals 10 can view. The monitoring instructor terminal 12 may evaluate the quality of such postings, authored by the instructor of an electronic course. The postings or portions thereof may be expressed as qualitative performance data.

The communications monitor 20 is coupled to the first database 32 for storage of quantitative performance data in the first database 32. The communications monitor 20 is coupled to the second database 34 for storage of qualitative performance data in the second database 34. In an alternate embodiment, quantitative performance data and qualitative performance data may be stored in a single database.

The data processing system 18 includes a data processor 22 that supports various software modules. For example, the data processor 22 may support a quantitative performance module 24, an evaluation module 26, and a qualitative performance module 28 as the software modules. The modules of the data processing system 18 may interact with one or more databases (e.g., 32, 34, and 36) in the storage device 30. For example, the quantitative performance module 24 may receive quantitative performance data from the first database 32. The qualitative performance module 28 may receive qualitative performance data from the second database 34. The lines or arrows interconnecting the databases (32, 34, 36) and modules (24, 26, 28) may represent logical relationships, physical data paths, or both.

The quantitative performance module 24 determines a quantitative evaluative factor from the quantitative performance data in the first database 32 or elsewhere. For example, the quantitative performance module 24 may process raw statistical data to achieve a quantitative evaluation factor. A quantitative evaluative factor refers to a numerical performance rating of an instructor with respect to the teaching of a particular section of an electronic course. For example, a quantitative evaluative factor or factors may include a course attendance factor (e.g., course completion rate), an instructor response time, or both. The central terminal 40 may compare the quantitative evaluative factor to a target performance rating to determine at least partial compliance of the instructor's performance with an overall teaching performance goal.

A qualitative performance module 28 facilitates the creation or organization of the evaluation report from qualitative performance data in a second database 34 or elsewhere. The qualitative performance module 28 may support the assembly of qualitative performance data and evaluation comments into a qualitative evaluation report. For example, the qualitative performance module 28 may allow the monitoring instructor terminal 12 to review the gathered qualitative performance data and enter evaluation comments (e.g., textual comments) for association with the gathered qualitative performance data to form the qualitative evaluation report. Further, the qualitative performance module 28 may provide a framework, an outline, or a questionnaire for organizing the evaluation comments into a qualitative evaluation report.

The evaluation module 26 may combine at least one quantitative evaluative factor and a qualitative evaluation report to form an output data structure, which may be referred to as a performance evaluation file. For instance, the qualitative evaluation report may be combined with the quantitative evaluative factor to form a performance evaluation file for an instructor with respect to a section of a course for a date or a teaching period. The evaluation module 26 may store the performance evaluation files of one or more instructors in the evaluation database 36. The instructors may be independent contractors of an on-line educational institution or employees of an on-line educational institution and still fall within the scope of the invention. In one embodiment, each performance evaluation may be indexed in the evaluation database 36 by one or more of the following reference data for subsequent reference: instructor identifier, course identifier, and course section identifier. The performance evaluation file will be described in greater detail in conjunction with FIG. 3.

The communications manager 19 supports communications among different students and instructor-to-student communications. As students participate in a section of the electronic course, the communications monitor 20 may monitor quantitative performance data on the students participating in the electronic course. The quantitative performance data measured may include measuring a first number of students enrolled at the beginning of an electronic course and measuring a second number of students that completed the course at the end of the same course. For example, the first number may be measured by sending an e-mail that polls student terminals 10 for a response that indicates that the student is participating in or intends to participate in the electronic course. In contrast, the second number may be based upon a number of students that successfully complete a threshold minimal number of assignments in addition to any mandatory tasks (e.g., tests or final exam). For instance, the threshold minimal number of assignments may be based on the number of assignments necessary to receive a passing or satisfactory grade.

The communications monitor 20 may monitor the communications between an instructor and one or more students in an electronic course to measure quantitative performance data. For example, the communications monitor 20 may track a student communication date (e.g., an assignment submittal date) of a student-generated communication (e.g., student assignment or student request) to an instructor (e.g., an instructor terminal 14) via the communications network 16. Further, the communication monitor may track a corresponding instructor feedback date that the instructor provides complete or adequate feedback to the student (e.g., the student terminal 10) via the communications network 16 based on the respective student's communication. The student communication date (e.g., assignment submittal date) and instructor feedback date may be determined on a student-by-student basis, an assignment-by-assignment basis, a class-by-class basis, or in another manner. The temporal difference between the student communication date and the instructor feedback date is called the instructor response time.

The data processor 22 includes a quantitative performance module 24 that is arranged to determine quantitative evaluative factors, such as a course attendance factor and instructor response time based on the stored quantitative performance data. For example, the quantitative performance module 24 may determine a course completion ratio as the course attendance factor. In the course completion ratio, a first number represents a numerator of the completion ratio and a second number represents a denominator of the ratio. The first number refers to the number of students enrolled at the beginning of the course, whereas the second number refers to the number of students who actually completed the course.

In an alternate embodiment, the course completion ratio may be expressed as a percentage. In yet another alternate embodiment, a course attrition rate or course attrition percentage may be used as an alternative measure to the course completion ratio. The course attrition rate is approximately equal to one minus the course completion ratio.

In another example, the quantitative performance module 24 includes determining a time difference between a student submittal date and an instructor feedback date for each request (e.g., an assignment or question) of each student The time difference represents an instructor response time for an associated instructor. The quantitative performance module 24 may determine an average or a mode for the instructor response time for each student in the section of the course, aggregately for all students in the section, or otherwise. Such an average or mode instructor response time may be referred to as an aggregate instructor response time.

In one embodiment, the performance evaluation module 26 determines an average instructor response time for feedback during a section of a course, a shortest duration for the instructor response time during a section of the course, and a longest duration for the instructor response time during a section of the course for the students of an electronic course.

In another embodiment, the instructor response time may be presented in a graphical form such as a histogram because the range of responses may be considered just as important as an average instructor response time.

An evaluation module 26 may determine if the quantitative factors comply with a qualifying threshold for qualifying the instructor for a performance -based component of instructor pay. In one example, the evaluation module 26 contains a reference course completion rate (e.g., a minimum course completion rate) and a reference instructor response time (e.g., a maximum instructor response time or a maximum aggregate instructor response time) based upon historical course completion rates and historical response times for similar electronic courses. The completion rate and reference response times may be based upon empirical studies and other factors. The determined course completion rate needs to meet or exceed the reference course completion rate (e.g., a minimum course completion rate) to find compliance with the reference course completion rate as the qualifying threshold. Similarly, the determined instructor response time (or aggregate instructor response time) needs to be less than or equal to the reference instructor response time (e.g., maximum instructor response time) as the qualifying threshold.

In one embodiment, the communications monitor 20 provides quantitative performance data automatically on an electronic course. The quantitative performance data provides statistical data on activities or events of students and activities or events of the instructor. Events such as log-in and log-off of respective students may be tracked to determine a student participation time cumulatively throughout the entire course or for portions of the course. The student participation time refers to the amount of time each student participates in an electronic course. Similarly, the durations of student-to-student interactions or student-to-instructor interactions may be timed. For example, the instructor may be required to spend a minimum amount of time with each student over the communications network 16 as a quantitative performance target.

The performance evaluation file in the performance evaluation database 36 may not contain an ultimate decision of whether a penalty, a benefit, or a financial award is awarded to the instructor based on the instructor's performance. Further, the stored performance evaluation file may not represent a final evaluation of the performance of the instructor until approved or modified by the central terminal 40.

A database management system 38 allows a central evaluator via a central terminal 40 to search and query the performance evaluation files in the performance evaluation database 36. The central terminal 40 may assess the data stored in the performance evaluation file to interpret it in a manner that takes in account the totality of circumstances and human judgment as to the appropriate financial treatment of the instructor. The central evaluator's goal is to treat instructors on an equal and impartial basis and to apply standards that reward instructors based on both qualitative and quantitative standards. Nevertheless, in one configuration the central evaluator of the central terminal 40 may accept a default performance evaluation conclusion present in the evaluation file. The default performance evaluation includes at least a quantitative performance evaluation with reference to any essential qualifying quantitative standards. Essential qualifying quantitative standards may be defined by the central evaluator, or otherwise, based on historical performance of instructors. The qualitative aspect of the performance evaluation is usually addressed by the central evaluator on an individual basis to achieve an accurate assessment of the instructors performance under the totality of the circumstances.

In one embodiment, a central evaluator associated with the central terminal 40 has supervisory oversight, management responsibility or other authority over a monitoring instructor associated with the monitoring instructor terminal 12. The monitoring instructor may be an independent contractor of the on-line educational institution or an employee of the on-line educational institution. In one embodiment, the scope of the supervisory oversight, management responsibility, or authority may be tailored as necessary to provide the unequivocal status of the monitoring instructor as an independent contractor.

The data processing system 18 supports tracking of aggregate quantitative statistics that may be used to gauge the performance of a monitoring instructor in monitoring one or more monitored instructors at instructor terminals 14. In general, the aggregate quantitative statistics refer to the average or mean quantitative performance data of a group or pool of monitored instructors, who are observed by a common monitoring instructor. For example, an aggregate quantitative statistic on the monitoring instructor may include the average deliverable turnaround time or average instructor response time for the monitored instructors included in a monitoring instructor's group.

The data processing system 18 may facilitate storage of the aggregate quantitative statistics or a precursor thereto (e.g., quantitative performance data of respective individual instructors) in the storage device 30. The data processor 22 of the data processing system 18 may contain an averaging unit or another calculator for determining an aggregate quantitative statistic based on quantitative performance data of multiple monitored instructors under a common monitoring agent. The central terminal 40 has access to the aggregate quantitative statistics on the monitoring instructor (or its underlying group of monitored instructors) via the database management system 38. The central evaluator may advise the monitoring instructor or provide appropriate feedback based on the central evaluator's assessment of the aggregate quantitative statistics (of the underlying group of monitored instructors). The central terminal 40 may support disciplinary action or reassignment of a different monitoring instructor to one or more monitored instructors as is necessary to foster a sound and productive on-line educational environment.

Figure 2:
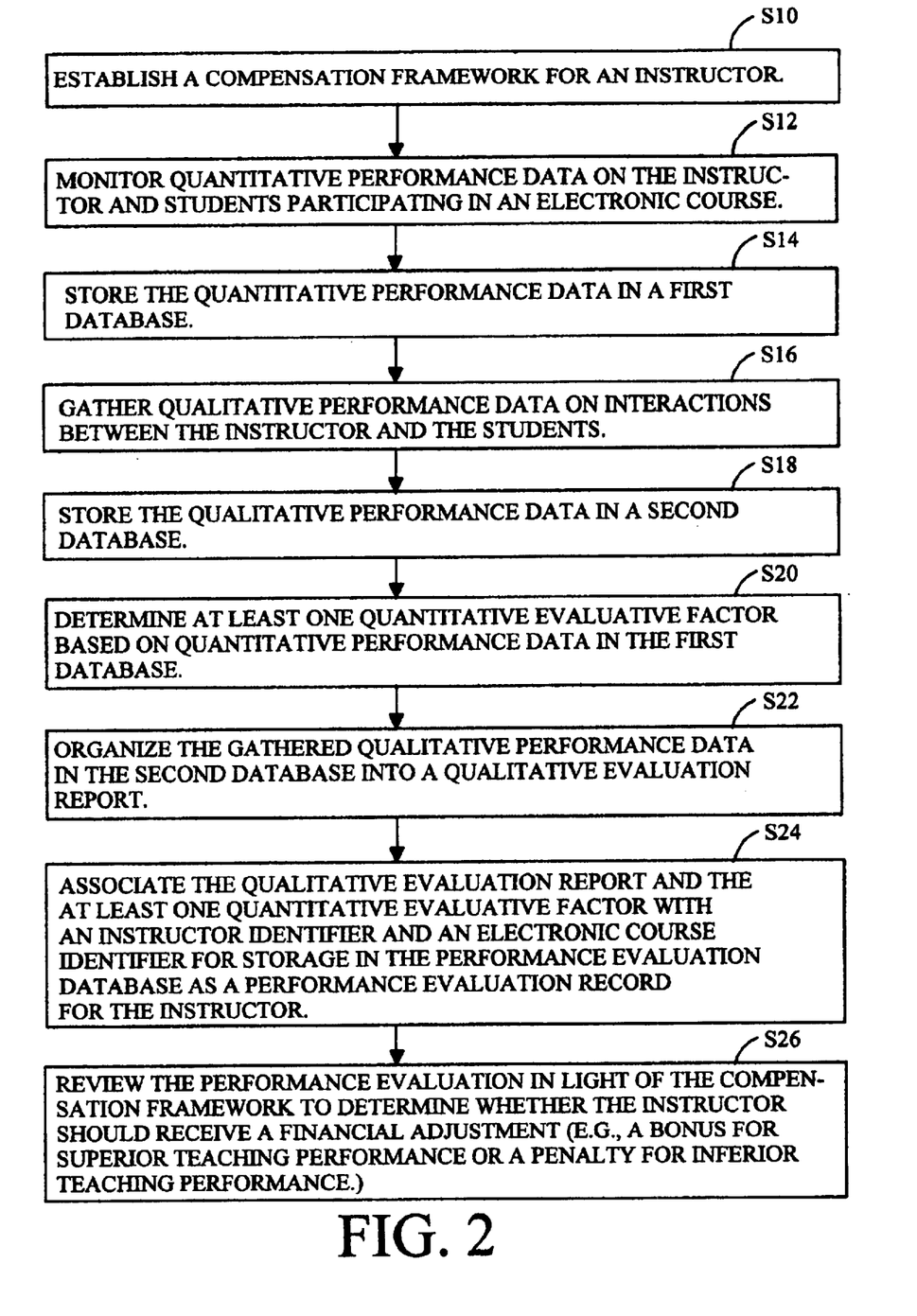
FIG. 2 is a flowchart of a method for evaluating the performance of an instructor of an electronic course in accordance with the invention.

FIG. 2 shows a flowchart of a method for evaluating the performance of an instructor of an electronic course. The method of FIG. 2 starts in step S10.

In step S10, a compensation framework is established for an instructor. The compensation framework may include a base component of pay for the instructor and a performance-based component of pay for the instructor concerning the teaching of a section of an electronic course. The base component plus the performance-based component generally equals the total instructor pay for teaching a section of a course during a given time period, typically excluding, but not necessarily excluding, any benefits such as profit sharing, retirement plans, pension plans, medical insurance coverage, and dental insurance coverage. The performance-based component is based on the instructor's performance during one or more sections of the course. A section refers to a work group that includes one or more students and at least one instructor for directing and assisting the students. The performance-based component may be negative to represent a penalty for a poor performance of the instructor. The performance component may be positive to represent a bonus for superior or above average performance of the instructor. The pay may be structured to promote the status of the instructor as an independent contractor of the on-line educational institution or as an employer in accordance with applicable laws.

In step S12, the data processing system 18 supports monitoring quantitative performance data on the instructor and students participating in an electronic course. For example, a communications monitor 20 may gather and archive quantitative performance data automatically on statistical events associated with students, associated with instructors or interactions between students and the instructor. In one example, the monitoring quantitative performance data includes measuring a first number of students enrolled at or near the temporal beginning of a course and measuring a second number of students that completed the course at or near the temporal end of the course.

In another example, monitoring quantitative performance data includes first measuring a student communication date (e.g., an assignment submittal date) of a student communication (e.g., a student assignment) transmitted to an instructor over the communications network 16. Second, the monitoring of quantitative performance data includes measuring a corresponding instructor feedback date based on a transmission of feedback (e.g., of a graded assignment) from an instructor to a particular student. The communications monitor 20 may gather other quantitative performance data based upon statistical observations such as the duration of instructor-student interactions on an individual student basis or a group basis. The communications monitor 20 may define and track still other quantitative performance data, including overall course participation, student satisfaction rating and a student survey in addition to the course completion rate and the instructor response time.

In step S14, the first database 32 stores quantitative performance data measured by the communications monitor 20 in step S12. The quantitative performance data may be stored in tables where the first database 32 comprises a relational database. In one example, the fields of the table may include a first number of students enrolled at the beginning of a section of the course and a second number of students that complete the course. In another example, the fields of the table may include student communication date (e.g., assignment data of students) and the corresponding feedback response data of the instructor. The student communication date and the feedback response date are preferably associated with corresponding student identifier, a course identifier, and a section identifier.

In step S16, the communications monitor 20 gathers qualitative performance data on interactions between the instructor and the students. For example, the communications monitor 20 supports the ability of the monitoring instructor terminal 12 to observe communications or interactions between the student terminal 10 and the instructor terminal 14, between or among student terminals 10 or otherwise. In one embodiment, the communications monitor 20 may extract and record excerpts or samples of student-instructor interactions for later analysis by the monitoring instructor terminal 12. In another embodiment, the communications monitor 20 supports real-time eavesdropping by the monitoring instructor terminal 12 on communications associated with the electronic course.

In step S18, the communications monitor 20 stores the qualitative performance data in the second database 34. The qualitative performance data may represent illustrative samples or excerpts of communications between the instructor and one or more students. Further, the qualitative performance data may include notes or evaluation comments of the monitoring instructor terminal 12 which the monitoring instructor may later reference to form an evaluation report. The monitoring instructor 12 may accumulate such notes and evaluation comments on an on-going basis (e.g., at regular intervals) during the course.

In step S20, the quantitative performance module 24 determines at least one quantitative evaluative factor based on quantitative performance data in the first database 32. For example, the quantitative performance module 24 of the data processor 22 may determine the quantitative evaluative factors of a course attendance factor (e.g., course completion rate), an instructor response time, or both based upon the quantitative performance data from the first database 32.

The quantitative performance module 24 processes the quantitative performance data, which represents raw statistical data. The quantitative performance module 24 refines the raw statistical data into one or more quantitative evaluative factors. For example, the quantitative performance module 24 converts raw measurements into one or more of the following factors a course attendance factor, a course completion rate of students, a course attrition rate, a course completion percentage, a course attrition percentage, an instructor response time, an aggregate instructor response time, or the like.

In step S22, the qualitative performance module 28 facilitates organizing the gathered qualitative performance data in the second database 34 to form or create a qualitative evaluation report. For example, the qualitative performance module 28 may facilitate the monitoring instructor's augmentation of the qualitative performance data with evaluation comments. The monitoring instructor may be provided with a form, a questionnaire, or a communications address so that an evaluation report based on qualitative performance data may be created. The evaluation report reflects the monitoring instructors subjective and objective observation of interactions between an instructor and one or more students. In one embodiment, the qualitative performance module 28 references evaluation comments accumulated during a course over time.

In one example, the qualitative evaluation report authored via the monitoring instructor terminal 12 includes one or more of the following items: (1) an analysis of discussion-facilitation between students or between students and the instructor; (2) an analysis of progress guidance to students by the instructor; (3) a quality of instructor postings that are accessible via the student terminals 10 on a community or a common basis; (4) the quality of e-mail correspondence between an instructor and a student terminal 10; and (5) the quality of deliverable feedback by the instructor to the student based upon work product or question submitted by the student.

In general, the monitoring instructor reviews qualitative performance data with a view toward the extent that the instructor facilitates electronic discussions between or among students; the degree that the instructor provides meaningful guidance to the students to promote full completion of the course; and the instructor's ability to direct a meaningful and content-directed discussion among course participants. The monitoring instructor may review qualitative performance data, such as recorded excerpts of student-instructor communications, to determine if the instructor has built or attempted to build a suitable educational environment (e.g., working community) for the students through appropriate guidance of one or more students. If the instructor-student communications or other qualitative performance data evidences the encouragement of active student participation in a course, the provision of supplementary or explanatory materials on at least on an as-needed basis, and guidance to foster completion of the course materials, then the monitoring instructor may establish a qualitative evaluation report that reflects that the teaching instructor promoted a suitable educational environment.

In one example, the monitoring instructor may author or create a qualitative evaluation report that covers discussion facilitation and instructor guidance of the teaching instructor based upon one or more of the following factors: (1) the extent that the teaching instructor motivates students to respond to classmate inquiries via e-mail or an electronic bulletin board, (2) the extent to which the teaching instructor provides appropriate guidance via posted comments on an electronic bulletin board, (3) the extent that the instructor develops an on-line personality to foster student interaction and interest, such as injecting humor and levity into the discussion, (4) the extent that instructor monitors inter-student interaction and identifies correct responses and communications with respect to content exchange and informational exchange among the students, (5) the extent that the instructor monitors individual student participation and progress to identify existing and potential impediments to course completion, (6) the extent that the instructor makes a concerted effort to understand individual student circumstances that may affect course progression or detract from the ability of other students to learn, (7) the ability of the instructor to provide targeted guidance via discussion comment, discussion posting, e-mails and deliverable feedback to ensure a rich and efficient learning opportunity.

In the qualitative performance report, the monitoring instructor may include an evaluation of the quality of postings of the instructor. The quality of the postings may include an evaluation of grammar of the language in the posting, the clarity of the posting, the relevance of the posting to the course. The monitoring instructor may consider a posting relevant if the posting addresses the place that most students are in at the course at the time of the posting or if the posting applies to a current or previous discussion or e-mail communication between an instructor and a student or between multiple students.

In the qualitative performance report, the monitoring instructor may determine the degree of responsiveness of the teaching instructor to individual e-mail inquiries, as well as the grammar, clarity, and relevance of the e-mail. The monitoring instructor may evaluate the instructor's feedback on the work product, assignments, or questions of the students. The monitoring instructor may evaluate the quality of the instructor's feedback to see if the instructor's comments are objective and justify grades assigned by the instructor to the student's work products. Further, the monitoring instructor may determine whether the teaching instructor successfully identified areas for improvement of the student in the instructor feedback. The monitoring instructor may check to see whether the instructor identified any reading materials or any reference information in the course or tutorials in the course that would support a better understanding of the areas in which the student was deficient or needed improvement in the work product.

The monitoring instructor may consider secondary factors for effectiveness of the instructor's feedback on a student work product. Secondary factors are desirable, but not essential to a successful learning experience or teaching of an electronic course. For example, the secondary factors may include the monitoring instructor determining if the teaching instructor incorporates references to current events in the discussion.

In step S22, the communications monitor 20 may gather qualitative evaluation reports and qualitative performance data from one or more monitoring instructor terminals 12 that monitor a particular section of a course. The qualitative performance data for the report may be stored in a second database 34 along with a course section identifier and an instruction identifier for the instructor.

The monitoring instructor may determine the quality of interaction between at least one student and the instructor of the electronic course on a regular schedule of sample observations of student-instructor communications over a communications network 16. For example, the monitoring instructor may assess the quality of student-instructor interaction on a daily basis. The monitoring instructor may employ a monitoring instructor terminal 12 for observing student-to-instructor interactions in real-time, for recording student-to-instructor interactions for later analysis, for observing instructional guidance to at least one student for later analysis. The monitoring instructor may develop evaluation comments based on the foregoing monitored interactions or other qualitative performance data.

The data processing system 18 or the qualitative performance module 28 receives qualitative performance data from the second database 34. The qualitative performance module 28 may facilitate creation of a qualitative evaluation report in a standard format for subsequent review. The monitoring instructor terminal 12 may review the qualitative performance data and enter evaluation comments (e.g., visual, audio-visual, multimedia or textual comments) to form the qualitative evaluation report.

In step S24, the data processing system 18 associates the qualitative evaluation report and the at least one quantitative evaluative factor with an instructor identifier and an electronic course identifier for storage in a performance evaluation database 36 as a performance evaluation file for the instructor. The qualitative evaluation report may be a textual file or another data structure that contains evaluation comments or opinions entered via the monitoring instructor terminal 12.

In step S26, the data processing system 18 supports a review of the performance evaluation (e.g., the performance evaluation file) in light of the compensation framework to determine whether the evaluated instructor should receive a financial adjustment (e.g., a bonus for superior teaching performance or a penalty for inferior teaching performance). For example, a central evaluator may review performance evaluations (e.g., performance evaluation files) via a central terminal 40 and a database management system 38. The central evaluator may review a performance evaluation and decide on whether to grant a performance-based component of the instructor's pay based on the totality of the circumstances surrounding the performance of the instructor.

The performance evaluation file may contain quantitative data from the performance module and a qualitative report. The evaluation module 26 may evaluate the quantitative evaluative factor data to determine if the quantitative evaluative factors meet or exceed a qualifying threshold for qualifying an instructor for a performance based component of the pay for the instructor. The evaluation module 26 may consider at least one of a course attendance factor and an instructor response time as the qualifying thresholds. For example, the evaluation module 26 may store a reference course attendance factor (e.g., minimum course completion rate) and a reference instructor response time (e.g., a maximum instructor response time) as the qualifying thresholds. If the determined course attendance factor and the determined instructor response time complies with the reference course attendance factor (e.g., minimum course completion rate) and reference instructor response time (e.g., maximum instructor response time), respectively, then the evaluation module 26 may flag the performance evaluation of the instructor as potentially acceptable or validated for favorable performance treatment. Conversely, if the determined course attendance factor (e.g., course completion rate) and the determined instructor response time does not comply with the reference course attendance factor (e.g., minimum course completion rate) and the reference instructor response time (e.g., maximum instructor response time), respectively, the evaluation module 26 may flag the performance evaluation of the instructor as deficient.

The central terminal 40 may retrieve and display the performance evaluation file to facilitate the making of a final decision on whether or not to grant an actual financial bonus to the instructor based upon the instructor's compliance with one or more qualifying thresholds consistent with the compensation framework. For example, the central evaluator may consider whether the instructor met a quantitative evaluative factor of the qualifying threshold and any degree of any excess with respect to the qualifying threshold, among other factors. In general, the central terminal 40 may establish a performance-based component of the total pay for an instructor based on the quantitative evaluative factors and qualitative performance factors under a totality of circumstances evaluation. Thus, the central terminal 40 has discretion to determine the performance-based component consistent with the compensation framework and performance evaluation file of the instructor for one or more sections or courses.

Although steps S10–S26 are set forth a certain sequence, in FIG. 2 steps S10–S26 may be accomplished in virtually any sequence or order so long as the monitoring of quantitative performance data precedes the storage of such data in the first database 32 and so long as the gathering of the qualitative performance data precedes the storage of the qualitative performance data in the second database 34.

Figure 3:
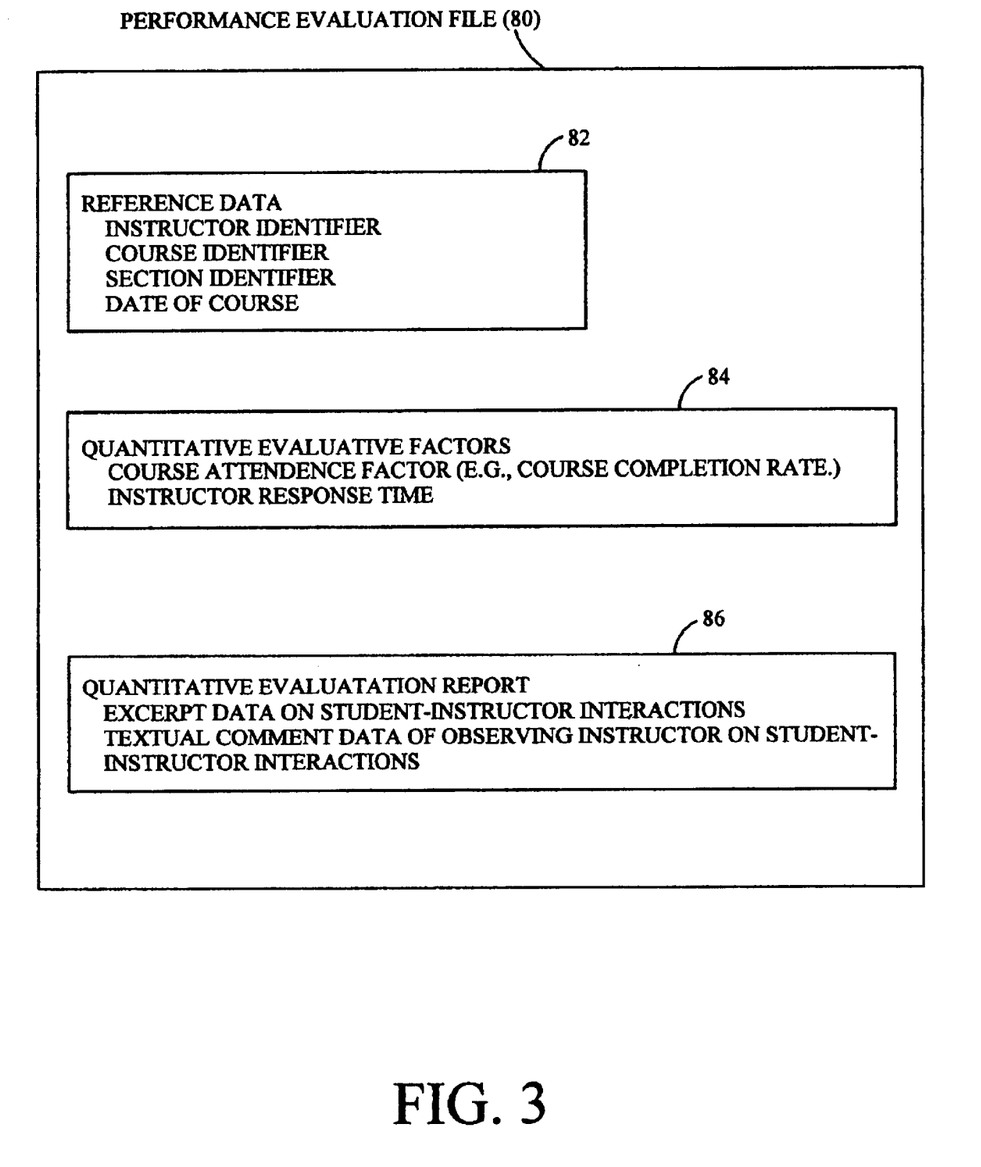
FIG. 3 provides an illustrative diagram of a data structure for a performance evaluation in accordance with the invention.

FIG. 3 shows an illustrative data structure of a performance evaluation file 80 in accordance with the invention. The performance evaluation file 80 may be divided into three sections: a reference section 82, a quantitative section 84 and qualitative section 86. The performance evaluation file 80 may be organized as a table for storage in the performance evaluation database 36. The reference section 82 includes reference data, such as course identifier, instructor identifier, and section identifier.

The quantitative section 84 includes one or more quantitative evaluative factors, such as a course completion rate that may be expressed as a ratio of the number of students that successfully complete a course to the total number of students enrolled at or near a beginning of a course. The quantitative section 84 may include an instructor response time and overall course-participation-rate and a student-satisfaction rating.

The qualitative section 86 includes one or more qualitative performance factors. The qualitative performance factors in the performance evaluation file 80 include textual data. The textual data may be organized into a form for standardized categories and such form may include (1) a discussion component, (2) thread facilitation component, and (3) instructor guidance of students of the course.

In the reference section 82, the performance evaluation file 80 for a corresponding instructor may include reference data on a course identifier, a course section identifier, and an instructor identifier. The instructor identifier distinguishes the instructor from other instructors teaching at the on-line educational institution. The section identifier refers to an identifier for a work group of students and at least one instructor who is assigned to a course. The performance evaluation file may include a monitoring instructor identifier for the instructor that monitored the teaching instructor during at least part of the course.

In the quantitative section 84, the instructor response time or feedback turnaround time of an instructor may be based on the average or mode duration that it takes for an instructor to respond to a student inquiry, to provide feedback, or grade an assignment submitted by the student. The instructor response time may be expressed as a mode duration, an average duration or may represent a group of durational values. The group of durational values includes an average duration for response time among all of the students within a section or a course, the longest response time for responding to all of the students in the course, and the shortest response time. In an alternate embodiment, the instructor response time may be expressed as a histogram or a more a detailed metric than a single value (e.g., mode duration).

In the quantitative section 84, the overall course participation factor may represent one of the following: (1) the hours per week that each student participates in the course, (2) the total number of hours that a student participates in a course, (3) the percent of completed modules or activities or tutorials within a section of an electronic course or for an individual student, and (4) the number of e-mails exchanged between the student and instructor and/or between different students in the course. In the quantitative section 84, the student satisfaction rating may be measured on a scale and represents both an objective and subjective measurement of the comments of students based upon a survey distributed at the completion of the section of the course.

The qualitative section 86 may contain evaluation comments by a monitoring instructor on the teaching instructor's postings for a course, the quality of email correspondence for the course and the quality of feedback and instructional guidance provided by the teaching instructor.

The database management system 38 allows the central evaluator to access records in the performance evaluation database 36 by submitting queries or searches such that the central evaluator may make the final decision as to compensation that rewards the instructor for superior teaching performance or penalizes the instructor for poor teaching performance.

The method and system of the invention is well suited for promoting an educational environment in which an instructor is held accountable for his or her performance. The instructor is evaluated based upon both qualitative and quantitative factors that take into account both objective and subjective considerations. The evaluation is not so automated or rigorous as to detract from a fair and impartial evaluation of the instructor that is consistent with fostering an educational environment. Instead, while automation and electronic communications technology may be incorporated into the monitoring of the student-instructor interaction during the course, the discretion of the central evaluator and the discretion of the monitoring instructor coalesce to produce a realistic evaluation of instructor performance.

The on-line educational institution is better able to meet its financial goals and student-retention rates by being able to financially reward instructors that are able to generate an interest in on-line educational courses. Conversely, the on-line educational institution may penalize those instructors that are unable to generate such an interest, which may in turn lead to financial problems or the lack of a complete curriculum for an on-line educational institution.

The foregoing description of the evaluation method and system describes several illustrative examples of the invention. Modifications, alternative arrangements, and variations of these illustrative examples are possible and may fall within the scope of the invention. Accordingly, the following claims should be accorded the reasonably broadest interpretation, which is consistent with the specification disclosed herein, and not unduly limited by aspects of the preferred embodiments disclosed herein.

What is claimed is:

1. A method of evaluating performance of an instructor of an electronic course, the method comprising the steps of:
    monitoring quantitative performance data on the instructor and students participating in the electronic course;
    storing the monitored quantitative performance data in a first database;
    determining a quantitative evaluative factor of an instructor response time based on the quantitative performance data, where the instructor response time comprises a time period measured from a student communication to an instructor response; and
    deciding whether the determined quantitative evaluative factor complies with a qualifying threshold for qualifying the instructor for a performance-based component of the pay for the instructor.

2. The method according to claim 1 further comprising the steps of:
    gathering qualitative performance data on interactions between the instructor and the students;
    forming a qualitative evaluation report from the gathered qualitative performance data.

3. The method according to claim 2 further comprising the step of:
    storing the qualitative performance data in a second database.

4. The method according to claim 2 further comprising:
    establishing a performance-based component of pay for the instructor based on the determined quantitative evaluative factors and the formed qualitative evaluation report.

5. The method according to claim 1 wherein the monitoring quantitative performance data comprises measuring a first number of students enrolled about a beginning of a course; and measuring a second number of students that completed the course about an end of the course.

6. The method according to claim 5 wherein the determining step comprises forming the course completion ratio as a course attendance factor, the course completion ratio composed of the first number representing a numerator of the course completion ratio and the second number representing a denominator of the course completion ratio.

7. The method according to claim 1 wherein the monitoring activity comprises measuring an assignment submittal date of a student assignment and measuring a corresponding instructor feedback date based on the student's assignment submittal.

8. The method according to claim 7 wherein the determining step comprises determining a difference between the submittal date and the feedback date to determine the instructor response time.

9. The method according to claim 1 wherein the deciding step comprises complying with at least one of a minimum student attendance rate and a maximum instructor response time as the threshold qualifying requirement.

10. The method according to claim 1 further comprising assessing a quality of interaction between at least one student and the instructor of the electronic course on a regular schedule of sample observations of student-instructor communications over a communications network.

11. The method according to claim 10 wherein the assessing step involves assessing the quality of interaction on a daily basis by a monitoring faculty member.

12. The method according to claim 10 wherein the assessing step comprises providing a monitoring faculty member with a user terminal for observing student-to-professor interactions in real-time, for recording student-to-professor interactions for later analysis, for observing instructional guidance to at least one student for later analysis.

13. The method according to claim 1 wherein the attendance factor comprises a course completion ratio.

14. The method according to claim 13 wherein the course completion ratio comprises a ratio of the students enrolled at a beginning of the electronic course to the students who completed the electronic course.

15. The method according to claim 1 where the quantitative evaluative factor further includes a course attendance factor.

16. A system of evaluating the performance of an instructor of an electronic course, the system comprising:
    a communications monitor for monitoring quantitative performance data on the instructor and students participating in the electronic course;
    a database for storing the monitored quantitative performance data; and
    a data processor including a quantitative performance module and an evaluation module, the quantitative performance module arranged to determine a quantitative evaluative factor of an instructor response time based on the stored quantitative performance data, where the instructor response time comprises a time period measured from a student communication to an instructor response, the evaluation module arranged to determine if the quantitative evaluative factor meets or exceeds a qualifying threshold for qualifying the instructor for an a performance-based component.

17. The system according to claim 16 wherein the communications monitor measures a first number of students enrolled at about a beginning of a course and measures a second number of students that completed the course at about an end of the course.

18. The system according to claim 17 wherein the quantitative performance module is adapted to form a course completion ratio as the attendance factor, the course completion ratio defined by a first number representing a numerator of the course completion ratio and a second number representing a denominator of the course completion ratio.

19. The system according to claim 16 wherein the communications monitor measures an assignment submittal date of a student assignment and measures a corresponding instructor feedback date based on the student's assignment submittal.

20. The system according to claim 19 wherein the quantitative performance module determines a temporal difference between the submittal date and the feedback date to determine the instructor response time.

21. The system according to claim 16 wherein the evaluation module is arranged to determine at least one of a minimum student retention rate and a maximum instructor response time as the threshold qualifying requirement for providing a performance-based adjustment of the pay of the instructor.

22. The system according to claim 16 wherein the communications monitor supports the electronic observation and assessment of the quality of interaction between at least one student and the instructor of the electronic course on a regular schedule of sample observations via a communications network.

23. The system according to claim 22 wherein the communications monitor supports the assessment of the quality of interaction on a daily basis by a monitoring faculty member.

24. The system according to claim 23 wherein the communications monitor supports a user terminal for observing student-instructor interactions in real-time, for recording student-instructor interactions for later analysis, for observing instructional guidance to at least one student, and for recording student analysis for later analysis.

25. The system according to claim 16 further comprising a qualitative performance module for recording a qualitative assessment of an instructor-student interaction in a second database.

26. The system according to claim 16 wherein the quantitative evaluative factor includes a course attendance factor.

27. A system of evaluating the performance of an instructor of an electronic course, the system comprising:

a communications monitor for monitoring quantitative performance data on the instructor and students participating in the electronic course;

a database for storing the monitored quantitative performance data;

a data processor including a quantitative performance module and an evaluation module, the quantitative performance module arranged to determine a quantitative evaluative factor of at least one of a course attendance factor and an instructor response time based on the stored quantitative performance data, the evaluation module arranged to determine if the quantitative evaluative factor meets or exceeds a qualifying threshold for qualifying the instructor for an a performance-based component; and an averaging unit for averaging quantitative performance data of a group of monitored instructors, who are observed by a common monitoring instructor, to provide aggregate quantitative performance data for assessing performance of the common monitoring instructor.

* * * * *